US006384867B1

United States Patent
Seino et al.

(10) Patent No.: US 6,384,867 B1
(45) Date of Patent: May 7, 2002

(54) VIDEO DISPLAY APPARATUS CAPABLE OF DISPLAYING VIDEO SIGNALS OF A PLURALITY OF TYPES WITH DIFFERENT SPECIFICATIONS

(75) Inventors: Kenichi Seino; Mitsuo Kamiko, both of Miyagi-ken; Tomoyasu Katsuyama, Kanagawa-ken; Yoshihiro Date, Kanagawa-ken; Naoki Hagiwara, Kanagawa-ken, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/579,005

(22) Filed: May 25, 2000

(30) Foreign Application Priority Data

May 28, 1999 (JP) .......................................... 11-150727

(51) Int. Cl.[7] ................................................ H04N 5/46
(52) U.S. Cl. ........................ 348/558; 348/555; 348/556
(58) Field of Search ................................ 348/553, 554, 348/555, 556, 558; H04N 5/46, 5/44, 3/27

(56) References Cited

U.S. PATENT DOCUMENTS 5,132,793 A * 7/1992 Hirahata et al. ............ 248/556
5,231,490 A   7/1993 Park

* cited by examiner

Primary Examiner—Sherrie Hsia
(74) Attorney, Agent, or Firm—Brinks Hofer Gilson & Lione

(57) ABSTRACT

A video display apparatus comprises a video-signal processing circuit for processing an input video signal, a PLL circuit for generating a clock signal, a discrimination circuit for identifying the format of the input video signal and a specification circuit for specifying the format of video information to be displayed. In addition, the video display apparatus also includes a diver-control-signal generation circuit, a driver-control-signal switching circuit and a PLL-signal control circuit. The diver-control-signal generation circuit is used for generating control signals for controlling a gate driver and a source driver which are used for driving a display panel in accordance with the identified format of video information to be displayed. The driver-control-signal switching circuit is used for selecting control signals generated by the driver-control-signal generation circuit for controlling the gate driver and the source driver in accordance with the identified format of the input video signal and a specified display format. The PLL-signal control circuit is used for controlling the clock signal generated by the PLL circuit in accordance with the identified format of the input video signal and the specified display format.

6 Claims, 7 Drawing Sheets

FIG. 4

|  | NTSC (NORMAL) (4:3) | NTSC (NORMAL) (16:9) | NTSC (ENLARGE) (4:3) | NTSC (ENLARGE) (16:9) | PAL (4:3) | PAL (16:9) | HDTV (1080) | HDTV (1035) |
|---|---|---|---|---|---|---|---|---|
| NUMBER OF EFFECTIVE DISPLAY PIXELS IN THE HORIZONTAL DIRECTION | 647 | 862 | 720 | 960 | 720 | 960 | 960 | 919 |
| NUMBER OF EFFECTIVE DISPLAY PIXELS IN THE VERTICAL DIRECTION | 484 | 484 | ABOUT 540 | ABOUT 540 | ABOUT 540 | ABOUT 540 | 540 | 517 |
| NUMBER OF ACTUAL SCAN LINES | 485 | 485 | 485 | 485 | 575 | 575 | 1080 | 1035 |
| SCAN LINE CONVERSION METHOD | NONE | NONE | COPY | COPY | THINNING | THINNING | SUPER-POSITION | SUPER-POSITION |
| CLK FREQUENCY (MHz) | 36.86 | 32.74 | 41.02 | 36.46 | 41.54 | 36.92 | 37.13 | 35.54 |
| EFFECTIVE DISPLAY AREA CLK | 1/3 | 1/2 | 1/3 | 1/2 | 1/3 | 1/2 | 1/1 | 1/1 |
| OUTSIDE EFFECTIVE DISPLAY AREA CLK | 1/1 | 1/2 | 1/1 | — | 1/1 | — | — | 1/1 |

FIG. 8

|  | SEL1 | SEL2 | SEL3 |
|---|---|---|---|
| NTSC NORMAL 4:3 | 0 | 0 | 0 |
| NTSC NORMAL 16:9 | 1 | 0 | 0 |
| NTSC ENLARGE 4:3 | 0 | 1 | 0 |
| NTSC ENLARGE 16:9 | 1 | 1 | 0 |
| PAL 4:3 | 0 | 0 | 1 |
| PAL 16:9 | 1 | 0 | 1 |
| HDTV 1080 | 0 | 1 | 1 |
| HDTV 1035 | 1 | 1 | 1 |

VIDEO DISPLAY APPARATUS CAPABLE OF DISPLAYING VIDEO SIGNALS OF A PLURALITY OF TYPES WITH DIFFERENT SPECIFICATIONS

BACKGROUND OF THE INVENTION

1. Field of the Invention

In general, the present invention relates to a video display apparatus such as an LCD. More particularly, the present invention relates to a video display apparatus capable of displaying video signals of a plurality of types having different specifications.

2. Description of the Related Art

It is necessary to provide an information terminal for future multimedia with a function for receiving a number of picture sources of different types. As a representative technique for implementing this function, there are known a method of processing a signal to be displayed in a display unit itself and a method of processing the signal in a signal processing unit. In the former method, a picture is displayed by setting a wide operating range of a deflection system of the display unit and carrying out scanning in a manner matching a signal format of an input picture. Implemented as a multiscan system, the former method is an effective technique that can be realized at a relatively low cost for a display unit of the CRT type. For a plane display unit such as an LCD or a PDP adopting sequential scanning and using a fixed number of display pixels, however, the former method raises a problem of application difficulties.

In the latter method, on the other hand, an input picture signal is subjected to signal processing such as IP conversion and format conversion. For this reason, the latter method is flexible in that it can be applied to not only a CRT but also a plane display unit such as an LCD and a PDP. However, the latter method requires a memory with a large capacity for signal processing such as interlaced-scanning/sequential-scanning conversion, frame-rate conversion and picture-size shrinkage/enlargement conversion.

Thus, there has been proposed a technique in the picture IP conversion whereby the number of sampling points in the signal processing of the sub-Nyquist sampling for an intensity signal is reduced by half and this signal series is stored in a memory. Then, a signal series read out from the memory is decoded to reproduce. an intensity signal with the original number of sampling points. Subsequently, with this intensity signal used as a base, a signal of an interpolation scan line is generated in a motion-adaptive interpolation process to reduce the size of the memory by half.

However, the method described above has a problem of a higher cost and increased power consumption due to a need for a memory with a large size.

SUMMARY OF THE INVENTION

It is an object of the present invention addressing the problems described above to provide a video display apparatus capable of displaying video signals of a plurality of types and different specifications without requiring a memory with a large size.

The present invention provides a video display apparatus for displaying an input video signal as video information in a display format different from a format of the input video signal on a display panel with a plurality of pixels laid out thereon to form a matrix. The video display apparatus comprises: a video-signal processing circuit for converting the input video signal into a digital signal and processing the digital signal obtained as a result of conversion; a PLL circuit for generating a clock signal for the video-signal processing circuit; a discrimination means for identifying a format of the input video signal from the input video signal; a specification means for specifying a format of video information to be displayed on the display panel; a diver-control-signal generation means for generating control signals for controlling a gate driver for driving the display panel and control signals for controlling a source driver also for driving the display panel in accordance with a format of video information to be displayed on the display panel; a driver-control-signal switching means for selecting one of the control signals generated by the driver-control-signal generation means for controlling the gate driver and selecting one of control signals generated by the driver-control-signal generation means for controlling the source driver in accordance with a format of the input video signal identified by the discrimination means and a display format specified by the specification means; and a PLL-signal control means for controlling the clock signal generated by the PLL circuit in accordance with a format of the input video signal identified by the discrimination means and a display format specified by the specification means.

As described above, in the video display apparatus provided by the present invention, a particular control signal generated by the driver-control-signal generation means for controlling the gate driver and EL particular control signal generated by the driver-control-signal generation means for controlling the source driver are selected in accordance with a format of the input video signal identified by the discrimination means and a display format specified by the specification means. In addition, the video-signal processing circuit carries out processing with the clock signal from the PLL circuit controlled by the PLL-signal control means in accordance with a format of the input video signal identified by the discrimination means and a display format specified by the specification means. As a result, it is possible to display the input video signal as video information in a display format different from a format of the input video signal on the display panel without using a memory with a large size.

According to an aspect of the video display apparatus, the discrimination means identifies a format of the input video signal from an aspect ratio of the input video signal and the number of scan lines of the input video signal. In this way, the discrimination means is capable of identifying a format of the input video signal from a synchronization signal of the input video signal. Thus, the video display apparatus is desirable in that the circuit configuration of the discrimination means is simple.

According to another aspect of the video display apparatus, the discrimination means is capable of determining whether the input video signal is a signal of an NTSC system, a signal of a PAL system or a signal of an HDTV system only from the number of scan lines in the vertical period.

According to still another aspect of the video display apparatus, the specification means specifies a format of video information to be displayed on the display panel from an aspect ratio of the input video signal or the number of scan lines of the input video signal. This method of specification is particularly effective for a case in which the only difference between the display format and the format of the input video signal is the aspect ratio or the number of scan lines.

According to a further aspect of the video display apparatus, the video-signal processing circuit carries out processing based on a clock signal having a first frequency for a video period of the digital signal and a frequency for periods other than the video period different from the first frequency. Thus, the video display apparatus is desirable in that all pixels of the display panel can be displayed within a limited period of time in case the number of effective display pixels in the input video signal is smaller than the number of pixels on the display panel.

According to a still further aspect of the video display apparatus, the source driver for driving the display panel is driven by a clock signal having a first frequency for a video period of the digital signal and a frequency for periods other than the video period different from the first frequency. Thus, the video display apparatus is desirable in that all pixels of the display panel can be displayed within a limited period of time in case the number of effective display pixels in the input video signal is smaller than the number of pixels on the display panel.

BRIEF DESCRIPTION OF THE DRAWINGS

FIG. 4 is a table showing characteristics of display systems;

FIG. 8 is a table showing a relation between multiplexer control signals SEL1 to SEL3 and display systems.

DESCRIPTION OF THE PREFERRED EMBODIMENT

Figure 1:
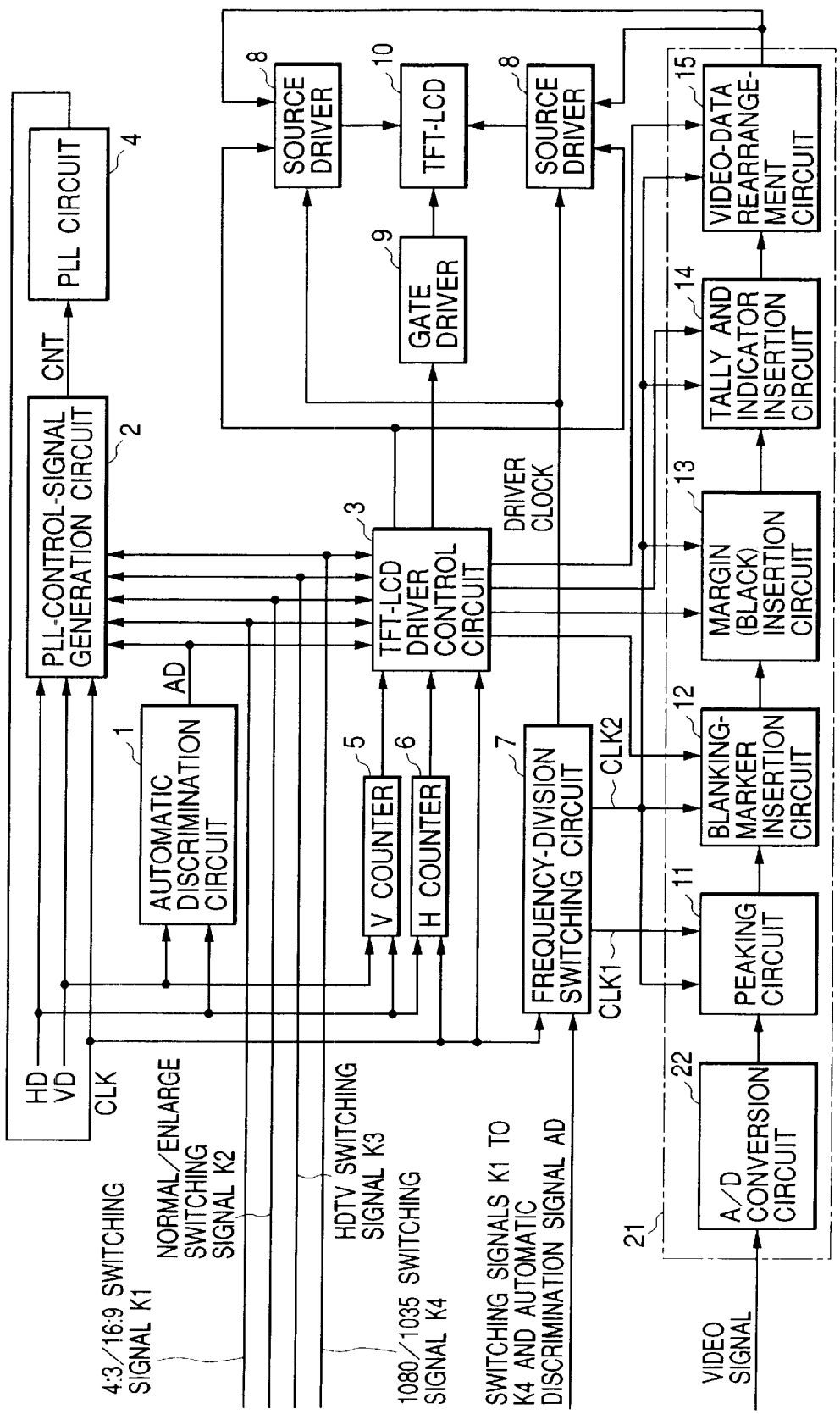
FIG. 1 is a block diagram showing a video display apparatus implemented by an embodiment of the present invention.

The configuration of a video display apparatus implemented by an embodiment of the present invention is described by referring to FIG. 1. As shown in the figure, a horizontal synchronization signal HD and a vertical synchronization signal VD are supplied to an automatic discrimination circuit 1. The automatic discrimination circuit 1 is a circuit for automatically determining whether a video signal supplied to the video display apparatus is an NTSC or PAL signal. An automatic discrimination signal AD output by the automatic discrimination circuit 1 is supplied to a PLL-control-signal generation circuit 2, a TFT-LCD driver control circuit 3 and a frequency-division switching circuit 7. The PLL-control-signal generation circuit 2 and the TFT-LCD driver control circuit 3 also receive a 4:3/16:9 switching signal K1, a normal/enlargement switching signal K2, an HDTV switching signal K3 and a 1080/1035 switching signal K4.

The horizontal synchronization signal HD, the vertical synchronization signal VD and a clock signal CLK are supplied to the PLL-control-signal generation circuit 2 which outputs a control signal CNT to a PLL circuit 4. The PLL circuit 4 generates the clock signal CLK.

The horizontal synchronization signal HD and the vertical synchronization signal VD are also supplied to a V counter 5 which outputs a signal to the TFT-LCD driver control circuit 3. The horizontal synchronization signal HD and the clock signal CLK are supplied to an H counter 6 which also outputs a signal to the TFT-LCD driver control circuit 3. It should be noted that the clock signal CLK is also supplied directly to the TFT-LCD driver control circuit 3.

The clock signal CLK, the switching signals K1 to K4 and the automatic discrimination signal AD are supplied to the frequency-division switching circuit 7 which outputs a driver clock signal to a source driver 8. In addition, a signal output by the TFT-LCD driver control circuit 3 is supplied to the source driver 8 and a gate driver 9. Signals output by the source driver 8 and the gate driver 9 are supplied to a TFT-LCD 10.

A video signal input to the video display apparatus is supplied to a video-signal processing circuit 21. Embedded in the video-signal processing circuit 21 are an A/D conversion circuit 22, a peaking circuit 11, a blanking-marker insertion circuit 12, a margin insertion circuit 13, a tally and indicator insertion circuit 14 and a video-data rearrangement circuit 15. The video signal supplied to the video-signal processing circuit 21 is fed to the A/D conversion circuit 22 which outputs a signal to the peaking circuit 11. A signal generated by the peaking circuit 11 is supplied to the blanking-marker insertion circuit 12 which outputs a signal to the margin insertion circuit 13. A signal output by the margin insertion circuit 13 is supplied to the tally and indicator insertion circuit 14 which outputs a signal to the video-data rearrangement circuit 15. A signal generated by the video-data rearrangement circuit 15 is the output of the video-signal processing circuit 21 which is supplied to the source driver 8.

A first output CLK1 of the frequency-division switching circuit 7 is supplied to the peaking circuit 11 whereas a second output CLK2 of the frequency-division switching circuit 7 is supplied to the peaking circuit 11, the blanking-marker insertion circuit 12, the margin insertion circuit 13, the tally and indicator insertion circuit 14 and the video-data rearrangement circuit 15. A signal output by the TFT-LCD driver control circuit 3 is supplied to the blanking-marker insertion circuit 12, the margin insertion circuit 13, the tally and indicator insertion circuit 14 and the video-data rearrangement circuit 15.

Figure 2:
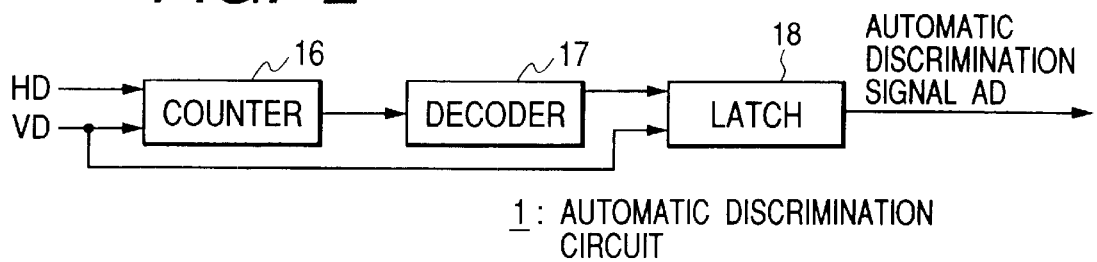
FIG. 2 is a diagram showing the internal configuration of an automatic discrimination circuit 1.

Next, the internal configuration of the automatic discrimination circuit 1 is explained by referring to FIG. 2. Embedded in the automatic discrimination circuit 1 are a counter 16, a decoder 17 and a latch 18 as shown in the figure. The horizontal synchronization signal HD and the vertical synchronization signal VD input to the automatic discrimination circuit 1 are supplied to the counter 16. In addition, the vertical synchronization signal VD is also supplied to the latch 18 as well. A signal output by the counter 16 is supplied to the decoder 17 which outputs a signal to the latch 18. The latch 18 generates an automatic discrimination signal AD. The automatic discrimination signal AD is output to components external to the automatic discrimination circuit 1. To be more specific, the automatic discrimination signal AD is supplied to the PLL-control-signal generation circuit 2, the TFT-LCD driver control circuit 3 and the frequency-division switching circuit 7.

Figure 3:
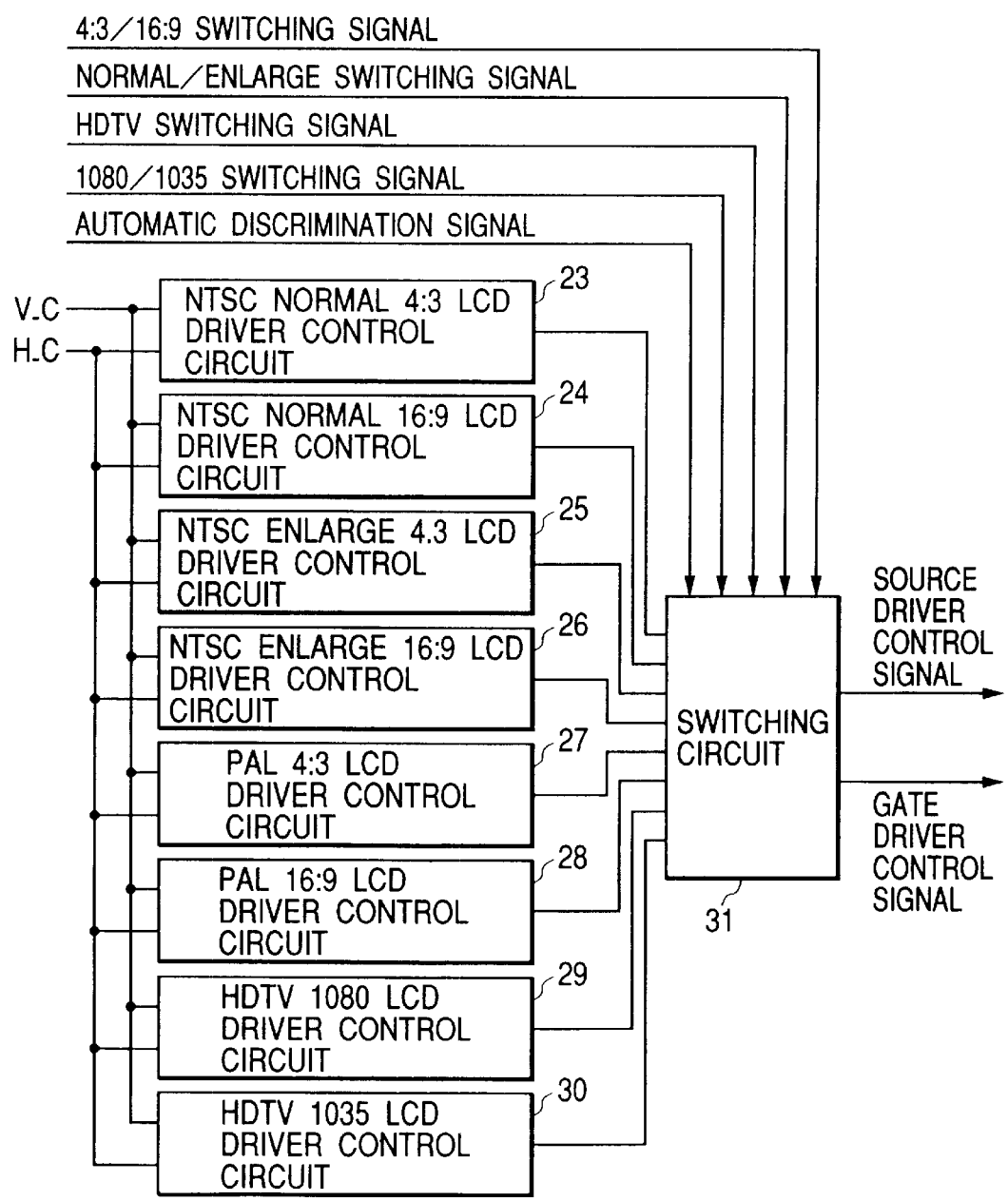
FIG. 3 is a diagram showing the internal configuration of a TFT-LCD driver control circuit 3.

Next, the internal configuration of the TFT-LCD driver control circuit 3 is explained by referring to FIG. 3. As shown in the figure, the TFT-LCD driver control circuit 3 comprises embedded components including an NTSC normal 4:3 LCD driver control circuit 23, an NTSC normal 16:9 LCD driver control circuit 24, an NTSC enlarge 4:3 LCD driver control circuit 25, an NTSC enlarge 16:9 LCD driver control circuit 26, a PAL 4:3 LCD driver control circuit 27, a PAL 16:9 LCD driver control circuit 28, an HDTV 1080 LCD driver control circuit 29, an HDTV 1035 LCD driver control circuit 30 and a switching circuit 31.

An output V_C of the V counter 5 and an output H_C of the H counter 6 are supplied to the LCD driver control circuits 23 to 30 which each output a signal to the switching circuit 31. The switching circuit 31 also receives the 4:3/16:9 switching signal K1, the normal/enlargement switching signal K2, the HDTV switching signal K3, the 1080/1035 switching signal K4 and the automatic discrimination signal AD. The switching circuit 31 outputs a source driver control signal and a gate driver control signal to the source driver 8 and the gate driver 9 respectively.

Next, the operation of this embodiment is explained by referring to FIG. 1. In order to determine whether a signal supplied to the video display apparatus is an NTSC or PAL signal, the automatic discrimination circuit 1 counts the number of times the horizontal synchronization signal HD goes from a high level to a low level during 1 V period which is defined as a period between a rising edge of the vertical synchronization signal VD and a falling edge following the rising edge.

Detailed internal operations of the automatic discrimination circuit 1 are explained by referring to FIG. 2. On the falling edge of the vertical synchronization signal VD supplied to the counter 16, the counter 16 is reset. After being reset, the counter 16 starts counting the number of times the horizontal synchronization signal HD supplied to the counter 16 goes from a high level to a low level. A falling-edge count obtained as a result of the counting is supplied to the decoder 17 to be decoded. For example, the decoder 17 outputs a signal at a low level when the falling-edge count output by the counter 16 becomes equal to 1 and outputs a signal at a high level when the falling-edge count becomes equal to 310. The signal output by the decoder is supplied to the latch 18 which latches the signal on the falling edge of the vertical synchronization signal VD.

An NTSC signal supplied to the video display apparatus is an interlace signal. Thus, the number of times the horizontal synchronization signal HD goes from a high level to a low level during 1 V period is about half the sum of the number of scan lines in a video period and the number of scan lines in a blanking period, that is, about half the sum of 485 and 40 which is 272 (=½×525). Thus, at the end of the 1 V period, that is, on the rising edge of the vertical synchronization signal VD, the signal output by the decoder 17 is reset at the low level which is latched in the latch 18 on the next falling edge of the vertical synchronization signal VD. As a result, the automatic discrimination signal AD generated by the latch 18 is also reset at the low level as well.

In the case of a PAL signal supplied to the video display apparatus, the number of times the horizontal synchronization signal HD goes from a high level to a low level during 1 V period is about half the sum of the number of scan lines in a video period (575) and the number of scan lines in a blanking period, that is, about 320. Thus, at the end of the 1 V period, that is, on the rising edge of the vertical synchronization signal VD, the signal output by the decoder 17 is set at the high level which is latched in the latch 18 on the next falling edge of the vertical synchronization signal VD. As a result, the automatic discrimination signal AD generated by the latch 18 is also reset at the high level as well.

Next, the operations of the PLL-control-signal generation circuit 2 and the PLL circuit 4 are explained by referring back to FIG. 1. The PLL-control-signal generation circuit 2 detects how many clocks are counted in an H period (1 horizontal period) and determines the frequency of the clock signal CLK output by the PLL circuit 4 on the basis of the result of the detection.

The TFT-LCD 10 has 960 pixels in the horizontal direction and 540 pixels in the vertical direction. If a picture with a pixel count different from the TFT-LCD 10 or an aspect ratio different from the TFT-LCD 10 is displayed on this screen, a margin area with none displayed thereon is resulted in on the screen.

Types of a video signal supplied to the video display apparatus include NTSC, PAL and HDTV. Furthermore, the HDTV type may have a scan line count of 1,080 or 1,035.

In the case of an NTSC video signal to be displayed on the TFT-LCD 10, display selections include a technique of displaying the input picture as it is (or a normal display method) and a technique of displaying an enlarged picture (or an enlarged display method). In addition, in the case of an NTSC or PAL video signal to be displayed on the TFT-LCD 10, display selections include a display technique with an aspect ratio of 4:3 unchanged as it is and a display technique adopting an aspect ratio of 16:9.

FIG. 4 is a table showing the number of pixels, the number of actual scan lines, a scan line change method, a clock frequency and a clock division ratio for each combination of the type of an input signal and a display technique. The combinations include NTSC normal 4:3, NTSC normal 16:9, NTSC enlarge 4:3, NTSC enlarge 16:9, PAL 4:3, PAL 16:9, HDTV 1080 and HDTV 1035.

Figure 5:
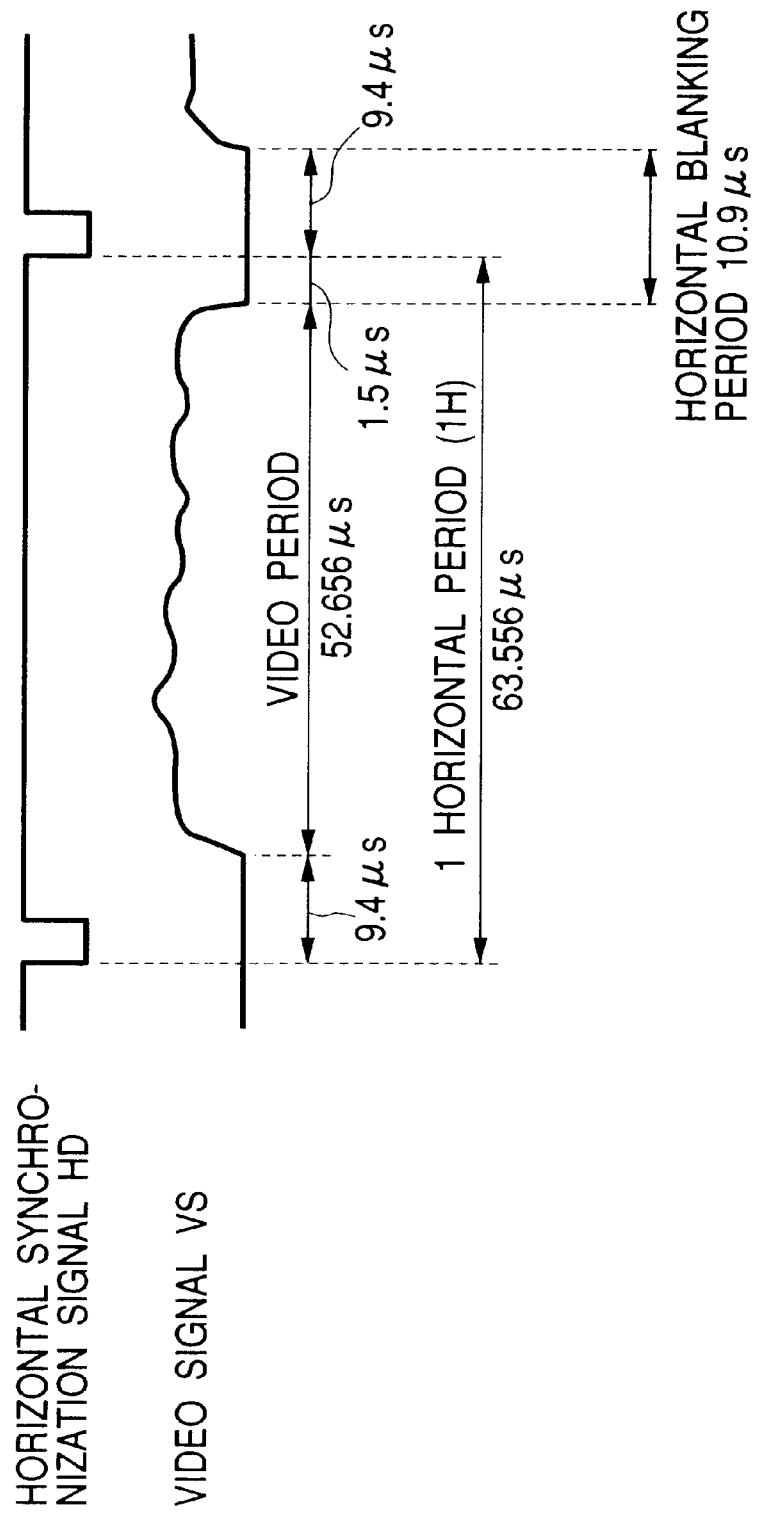
FIG. 5 is a diagram showing the waveform of a video signal observed in 1 horizontal period.

A method of displaying a margin area for the NTSC normal 4:3 display system is explained as follows. FIG. 5 is a diagram showing a relation between the horizontal synchronization signal HD and the vertical synchronization signal VD for the NTSC system. In the NTSC system, the number of effective scan lines in the vertical direction is 485 and the aspect ratio is 4:3. From the number of effective scan lines in the vertical direction and the aspect ratio, the number of effective pixels in the horizontal direction is found to be 485×4/3=647. Assume that 1 pixel can be sampled by a clock pulse. In this case, in order to sample data of 647 pixels during a video period of 52.656 $\mu$s shown in FIG. 5, it is necessary to provide a clock signal with a period of 52.656 $\mu$s/647 pixels=81.38 ns /pixel.

Thus, the number of pixels in a margin area with nothing displayed therein is 960−647=313. If these pixels are sampled by using a clock signal with a period of 81.38 ns, a time of 81.38 ns /pixel×313 pixels=25.47 $\mu$s is required. By subtracting the video period of 52.656 $\mu$s from a horizontal period of 63.556 $\mu$s, a horizontal blanking period is found to be 10.9 $\mu$s (=63.556 $\mu$s−52.656 $\mu$s) which is smaller than 25.47 $\mu$s. Thus, by using this horizontal blanking period, the entire margin area can not be sampled.

In order to display 313 pixels in the margin area during a horizontal blanking period of 10.9 $\mu$s, it is necessary to set the period of a clock signal for the margin area at a value smaller than 10.9 $\mu$s/313 pixels=34.8 ns/pixel. For example, by setting the frequency of the sampling clock signal for the margin area at a value 3 times that of the sampling clock signal for the video period, the period of the sampling clock signal for the margin area is 81.38 ns/3=27.13 ns which is shorter than 34.8 ns calculated above. That is to say, a time required for sampling the margin area is 27.13 ns×313 pixel=8.49 $\mu$s which is shorter than the horizontal blanking period of 10.9 $\mu$s.

Thus, in the case of the NTSC normal 4:3 display system, the period of the clock signal CLK is set at 27.13 ns and this clock signal CLK is used for sampling the margin area or used during the horizontal blanking period as it is. During the video period, the frequency of the clock signal CLK is divided by 3 by the frequency-division switching circuit 7 to provide a clock signal with a period of 81.38 ns (=3×27.13 ns). The number of clocks in 1 horizontal period is 63.556 μs/27.13 ns=2,343. The period of the clock signal CLK is set by the PLL-control-signal generation circuit 2.

A method of displaying a margin area for the NTSC normal 16:9 display system is explained as follows. In the NTSC system, the number of effective scan lines in the vertical direction is 485 and the aspect ratio is 16:9. From the number of effective scan lines in the vertical direction and the aspect ratio, the number of effective pixels in the horizontal direction is found to be 485× 16/9=862. Assume that 1 pixel can be sampled by a clock pulse. In this case, in order to sample data of 862 pixels during a video period of 52.656 μs as shown in FIG. 5, it is necessary to provide a clock signal with a period of 52.656 μs/862 pixels=61.09 ns/pixel.

Thus, the number of pixels in a margin area with nothing displayed therein is 960−862=98. If these pixels are sampled by using a clock signal with a period of 61.09 ns, a time of 61.09 ns/pixel×98 pixels=5.99 μs is required. By subtracting the video period of 52.656 μs from a horizontal period of 63.556 μs, a horizontal blanking period is found to be 10.9 μs. Thus, by using this horizontal blanking period, the entire margin area can thus be sampled. As a result, in the case of the NTSC normal 16:9 display system, a clock signal common to the video period and the horizontal blanking period can be used.

It should be noted, however, that in the case of the NTSC normal 4:3 display system, the clock frequency is 1/27. 13 ns=36.86 MHz. In the case of the NTSC normal 16:9 display system, on the other hand, the clock frequency is 1/61.09 ns=16.37 MHz which is lower than half the clock frequency of the NTSC normal 4:3 display system. The frequency can be changed by the PLL circuit 4. In general, however, if a wide variable-frequency range of the clock signal CLK output by the PLL circuit 4 is used, the stability of the PLL circuit 4 deteriorates. In order to solve this problem, the frequency of the clock signal for the NTSC normal 16:9 display system is set at 32.74 MHz which is twice the frequency of 16.37 MHz. At this frequency of 32.74 MHz, 1 pixel is sampled by 2 clock pulses.

Next, the HDTV 1080 display system is explained. In this case, the number of effective scan lines in the vertical direction is 1,080 which is greater than 540, the number of pixels in the vertical direction on the screen of the TFT-LCD 10. In order to solve this problem, odd fields and even fields are superposed on each other in the so-called thinning process to reduce the number of effective scan lines in the vertical direction to 540. From the number of effective scan lines in the vertical direction and the aspect ratio of 16:9, the number of effective pixels in the horizontal direction is found to be 540×16/9=960. Assume that 1 pixel can be sampled by a clock pulse. In this case, since the video period in 1 horizontal period according to HDTV specifications is 25.86 μs, the sampling period is 25.86 μs/960 pixels=26.94 ns/pixel which gives a sampling frequency of 37.125 MHz (=1/26.94 ns). This frequency is about the same as that of the NTSC normal 4:3 display system. In addition, since it is not necessary to display the margin area, the frequency of 37.125 MHz is used as it is without carrying out frequency division.

By applying the same concept, the sampling clock frequencies for the NTSC enlarge 4:3, NTSC enlarge 16:9, PAL 4:3, PAL 16:9 and HDTV 1035 display systems can be determined. The sampling clock frequencies for the display systems are shown in FIG. 5.

Next, the operations of the TFT-LCD driver control circuit 3, the V counter 5, the H counter 6 and the frequency-division switching circuit 7 are explained. The V counter 5 counts the number of HD pulses in 1 V period and the H counter 6 counts the number of rising CLK pulses in 1 H period. The V counter 5 and the H counter 6 control the TFT-LCD driver control circuit 3 on the basis of numbers obtained as results of counting by the V counter 5 and the H counter 6.

Next, the internal operation of the TFT-LCD driver control circuit 3 is explained by referring to FIG. 3. An output V_C of the V counter 5 and an output H_C of the H counter 6 are supplied to the LCD driver control circuits 23 to 30 which each output a driver control signal according to the respective display format to the switching circuit 31. The switching circuit 31 selects and outputs only a desired driver control signal.

The selection of the driver control signal by the switching circuit 31 is based on the 4:3/16:9 switching signal K1, the normal/enlargement switching signal K2, the HDTV switching signal K3, the 1080/1035 switching signal K4 and the automatic discrimination signal AD. The output of the switching circuit 31 is split into a source driver control signal and a gate driver control signal which are supplied to the source driver 8 and the gate driver 9 respectively.

The TFT-LCD driver control circuit 3 outputs a start pulse to the source driver 8 typically in order to determine a display start position in the horizontal direction. The source driver 8 then starts rendering the margin area at the time the start pulse in one horizontal period is received.

Figure 7:
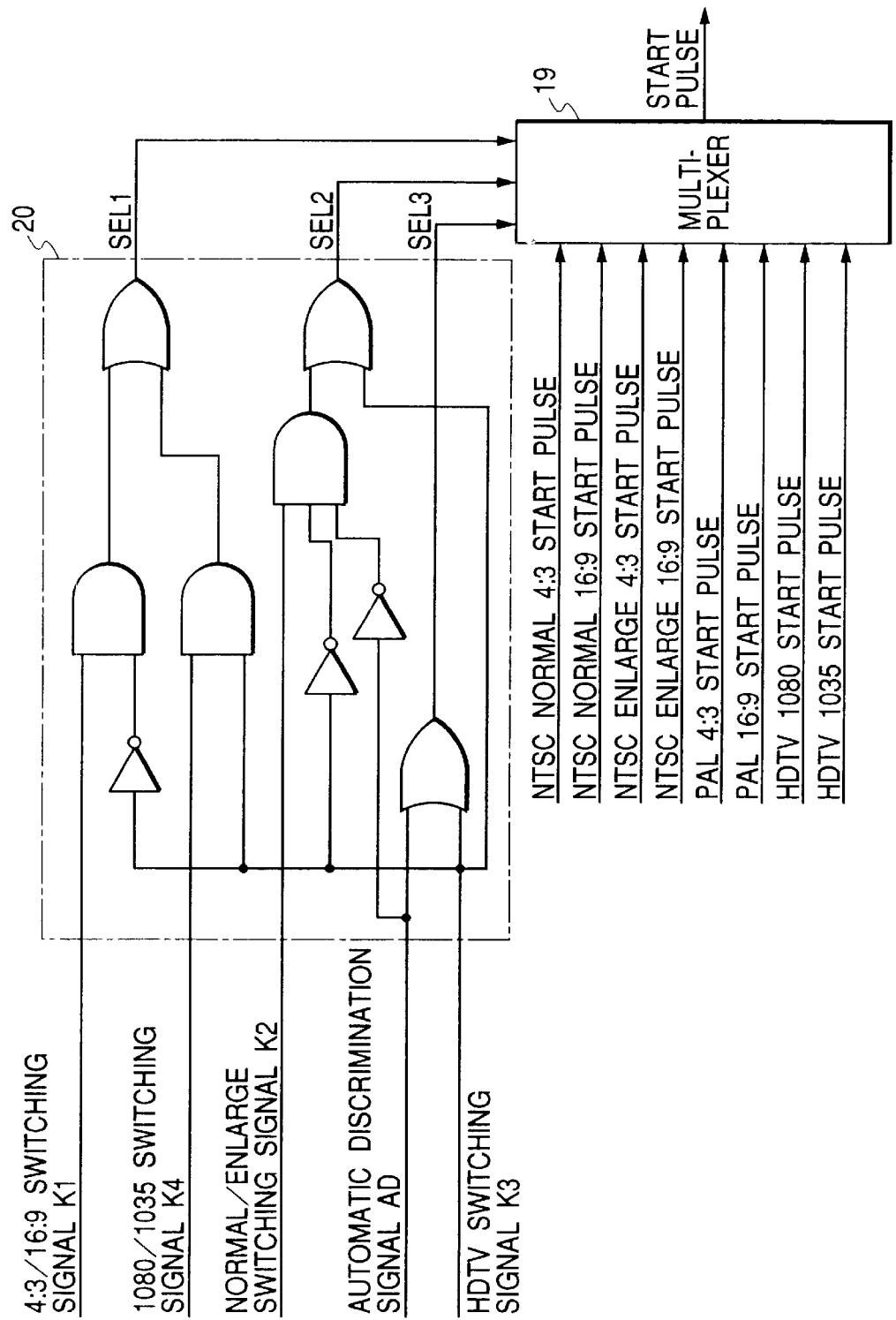
FIG. 7 is a diagram showing configurations of a multiplexer 19 and a gate circuit 20 which are employed in a switching circuit 31.

Next, a method to switch start pulse output timing is explained. The LCD driver control circuits 23 to 30 embedded in the TFT-LCD driver control circuit 3 generate start pulses for all the respective display systems. One of the start pulses that matches the display format is selected by a multiplexer 19 embedded in the switching circuit 31. The multiplexer 19 is shown in FIG. 7. The selected start pulse is supplied to the source driver 8 as a source driver control signal.

A gate circuit 20 shown in FIG. 7 is also embedded in the switching circuit 31. As shown in the figure, the gate circuit 20 receives the switching signal K1 to K4 and the automatic discrimination signal AD, and the switching signal K1 to K4 and the automatic discrimination signal AD are converted into multiplexer control select signals SEL1 to SEL3 which are supplied to the multiplexer 19. The multiplexer control select signals SELL to SEL3 control the multiplexer 19 to carry out switching operations in accordance with a flowchart shown in FIG. 6. To be more specific, the multiplexer 19 selects one of input start pulses with a plurality of types in accordance with the multiplexer control select signals SEL1 to SEL3 received from the gate circuit 20. A relation between the multiplexer control select signals SEL1 to SEL3 and start pulses to be selected in accordance with the multiplexer control select signals SEL1 to SEL3 is shown in FIG. 8.

A pulse signal selected by the switching circuit 31 is used for generating control signals supplied to the source driver 8 and the gate driver 9.

It should be noted that the switching signal K1 to K4 are also supplied to the PLL-control-signal generation circuit 2 which outputs a PLL control signal CNT to the PLL circuit 4. The PLL control signal CNT is changed in dependence on the switching signal K1 to K4 so that the frequency of a clock signal CLK generated by the PLL circuit 4 is also changed in dependence on the switching signal K1 to K4.

Figure 6:
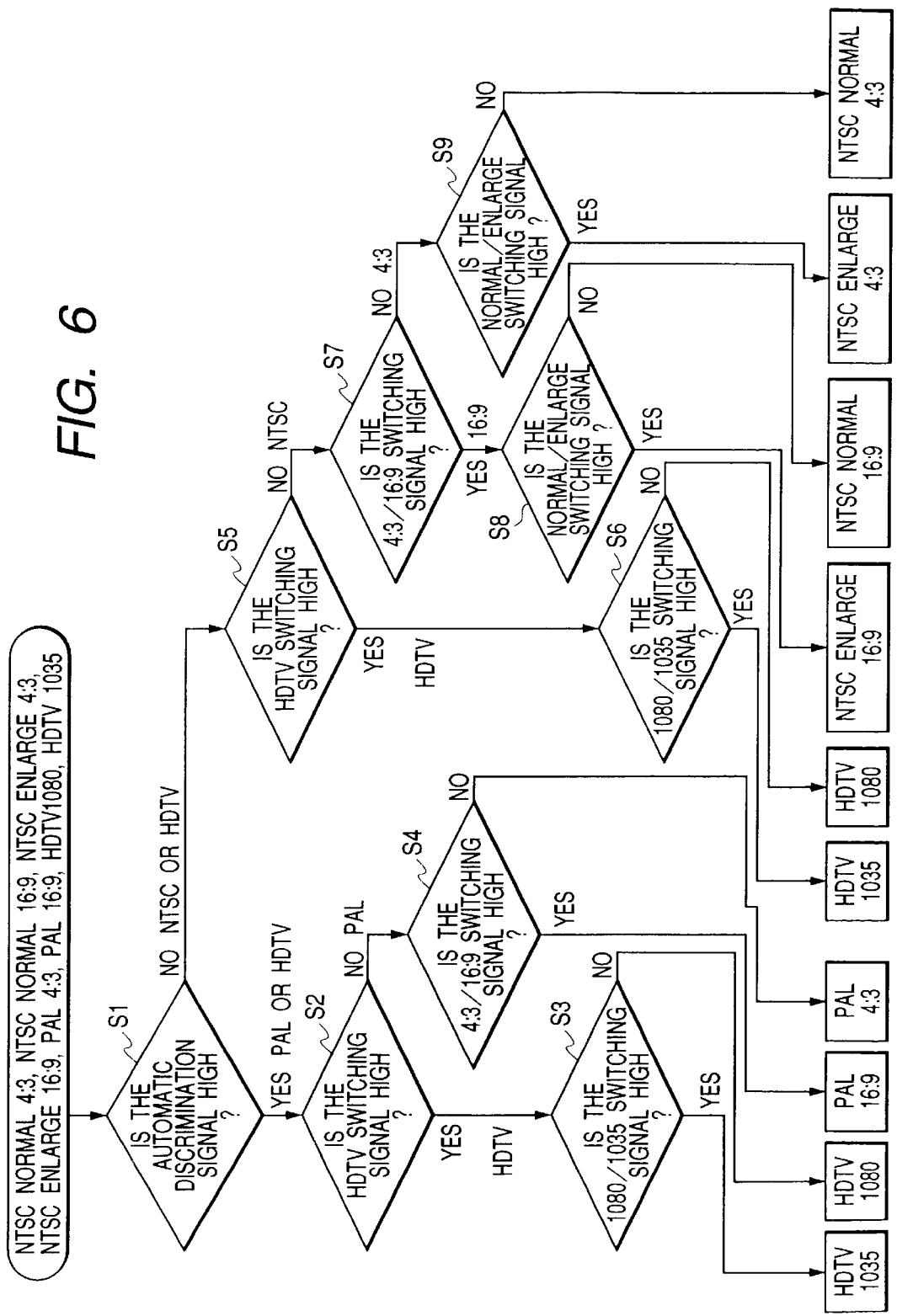
FIG. 6 shows a flowchart. representing operations to determine a display system.

Next, operations to determine the display system is explained by referring to the flowchart shown in FIG. 6. It should be noted that symbols S1 and the like used in the following description each represent a step in the flowchart.

As shown in the figure, the flowchart begins with a step S1 at which the level of the automatic discrimination signal AD output by the automatic discrimination circuit 1 is examined. An automatic discrimination signal AD set at a high level indicates that the video signal supplied to the video display apparatus is a PAL or HDTV signal. In this case, the flow of the processing goes on to a step S2. On the other hand, an automatic discrimination signal AD reset at a low level indicates that the video signal supplied to the video display apparatus is an NTSC or HDTV signal.

In this case, the flow of the processing goes on to a step S5.

At the step S2, the level of the HDTV switching signal K3 is examined. If the HDTV switching signal K3 is found set to the high level, that is, if the video signal supplied to the video display apparatus is an HDTV signal, the flow of the processing goes on to a step S3. If the HDTV switching signal K3 is found reset at the low level, that is, if the video signal supplied to the video display apparatus is a PAL signal, on the other hand, the flow of the processing goes on to a step S4.

At the step S3, the level of the 1080/1035 switching signal K4 is examined. If the 1080/1035 switching signal K4 is found set to the high level, that is, if the video signal supplied to the video display apparatus is an HDTV 1035 signal, the display system is switched to HDTV 1035. If the 1080/1035 switching signal K4 is found reset at the low level, that is, if the video signal supplied to the video display apparatus is a HDTV 1080 signal, on the other hand, the display system is switched to HDTV 1080.

At the step S4, the level of the 4:3/16:9 switching signal K1 is examined. If the 4:3/16:9 switching signal K1 is found set to the high level, that is, if the video signal supplied to the video display apparatus is a PAL signal with an aspect ratio of 16:9, the display system is switched to PAL with an aspect ratio of 16:9. If the 4:3/16:9 switching signal K1 is found reset at the low level, that is, if the video signal supplied to the video display apparatus is a PAL signal with an aspect ratio of 4:3, on the other hand, the display system is switched to PAL signal with an aspect ratio of 4:3.

At the step S5, the level of the HDTV switching signal K3 is examined. If the HDTV switching signal K3 is found set to the high level, that is, if the video signal supplied to the video display apparatus is an HDTV signal, the flow of the processing goes on to a step S6. If the HDTV switching signal K3 is found reset at the low level, that is, if the video signal supplied to the video display apparatus is an NTSC signal, on the other hand, the flow of the processing goes on to a step S7.

At the step S6, the level of the 1080/1035 switching signal K4 is examined. If the 1080/1035 switching signal K4 is found set to the high level, that is, if the video signal supplied to the video display apparatus is an HDTV 1035 signal, the display system is switched to HDTV 1035. If the 1080/1035 switching signal K4 is found reset at the low level, that is, if the video signal supplied to the video display apparatus is a HDTV 1080 signal, on the other hand, the display system is switched to HDTV 1080.

At the step S7, the level of the 4:3/16:9 switching signal K1 is examined. If the 4:3/16:9 switching signal K1 is found set to the high level, that is, if the video signal supplied to the video display apparatus is an NTSC signal with an aspect ratio of 16:9, the flow of the processing goes on to a step S8. If the 4:3/16:9 switching signal K1 is found reset at the low level, that is, if the video signal supplied to the video display apparatus is an NTSC signal an aspect ratio of 4:3, on the other hand, the flow of the processing goes on to a step S9.

At the step S8, the level of the normal/enlargement switching signal K2 is examined. If the normal/enlargement switching signal K2 is found set to the high level, that is, if the NTSC video signal supplied to the video display apparatus with an aspect ratio of 16:9 is to be output as an enlarged display, the display system is switched to HDTV enlarged 16:9. If the normal/enlargement switching signal K2 is found reset at the low level, that is, if the NTSC video signal supplied to the video display apparatus with an aspect ratio of 16:9 is not to be enlarged but to be output as a normal display, on the other hand, the display system is switched to HDTV normal 16:9.

At the step S9, the level of the normal/enlargement switching signal K2 is examined. If the normal/enlargement switching signal K2 is found set to the high level, that is, if the NTSC video signal supplied to the video display apparatus with an aspect ratio of 4:3 is to be output as an enlarged display, the display system is switched to HDTV enlarged 4:3. If the normal/enlargement switching signal K2 is found reset at the low level, that is, if the NTSC video signal supplied to the video display apparatus with an aspect ratio of 4:3 is not to be enlarged but to be output as a normal display, on the other hand, the display system is switched to HDTV normal 4:3.

According to the present invention, it is possible to display video information with a variety of formats on a video display apparatus without using a memory with a large size. As a result, the cost and the power consumption of the apparatus can be suppressed.

What is claimed is:

1. A video display apparatus for displaying an input video signal as video information in a display format different from a format of the input video signal on a display panel with a plurality of pixels laid out thereon to form a matrix, the video display apparatus comprising:

a video-signal processing circuit to convert the input video signal into a digital signal and processing the digital signal obtained as a result of conversion;

a PLL circuit to generate a clock signal for the videosignal processing circuit;

a discrimination mechanism to identify a format of the input video signal from the input video signal;

a specification mechanism to specify a format of video information to be displayed on the display panel;

a driver-control-signal generation mechanism to generate control signals to control a gate driver driving the display panel and control signals to control a source driver also driving the display panel in accordance with the format of video information to be displayed on the display panel;

a driver-control-signal switching mechanism to select one of the control signals generated by the driver-control-signal generation mechanism for control the gate driver and to select one of the control signals generated by the driver-control-signal generation mechanism to control the source driver in accordance with the format of the input video signal identified by the discrimination mechanism and the display format specified by the specification mechanism; and a PLL-signal control mechanism to control the clock signal generated by the PLL circuit in accordance with the format of the input video signal identified by the discrimination mechanism and the display format specified by the specification mechanism.

2. A video display apparatus according to claim 1, wherein the discrimination mechanism identifies the format of the input video signal from an aspect ratio of the input video signal and a number of scan lines of the input video signal.

3. A video display apparatus according to claim 2, wherein the discrimination mechanism determines whether the input video signal is a signal of an NTSC system, a signal of a PAL system or a signal of an HDTV system.

4. A video display apparatus according to claim 1 wherein the specification mechanism specifies the format of video information to be displayed on the display panel from an aspect ratio of the input video signal and a number of scan lines of the input video signal.

5. A video display apparatus according to claim 1, wherein the video-signal processing circuit carries out processing based on a clock signal having a first frequency for a video period of the digital signal and a second frequency for periods other than the video period different from the first frequency.

6. A video display apparatus according to claim 1, wherein the source driver driving the display panel is driven by a clock signal having a first frequency for a video period of the digital signal and a second frequency for periods other than the video period different from the first frequency.

* * * * *

UNITED STATES PATENT AND TRADEMARK OFFICE
CERTIFICATE OF CORRECTION

PATENT NO. : 6,384,867 B1  Page 1 of 1
DATED : May 7, 2002
INVENTOR(S) : Kenichi Seino et al.

It is certified that error appears in the above-identified patent and that said Letters Patent is hereby corrected as shown below:

Title page,
Item [57], ABSTRACT,
Line 7, delete "diver" and substitute -- driver -- in its place.
Line 9, delete "diver" and substitute -- driver -- in its place.

Column 10,
Line 52, delete "videosignal" and substitute -- video-signal -- in its place.

Column 12,
Line 1, insert -- , -- (comma) immediately after "to claim 1".

Signed and Sealed this

Eleventh Day of March, 2003

JAMES E. ROGAN
*Director of the United States Patent and Trademark Office*